United States Patent [19]

Schmerda et al.

[11] Patent Number: 4,540,223
[45] Date of Patent: Sep. 10, 1985

[54] POSITIVE ELECTRICAL CONNECTING MECHANISM

[75] Inventors: Joseph M. Schmerda, Oak Creek; Clarence F. Piojda, Hales Corners, both of Wis.

[73] Assignee: General Motors Corporation, Detroit, Mich.

[21] Appl. No.: 591,176

[22] Filed: Mar. 19, 1984

[51] Int. Cl.³ .............................................. H01R 39/00
[52] U.S. Cl. ..................................................... 339/3 S
[58] Field of Search ........................... 339/5, 3 R, 3 S; 338/79

[56] References Cited

U.S. PATENT DOCUMENTS 2,027,275  1/1936  Foster ........................................ 74/95
3,691,871  9/1972  Gladow et al. ........................... 74/798
3,763,455  10/1973  Confer et al. ........................ 339/3 S

OTHER PUBLICATIONS

Moll et al., "Flex Life in Cables", Electronic Packaging and Production, 6/1976, pp. w29, w30, w34, w35.

*Primary Examiner*—Eugene F. Desmond
*Attorney, Agent, or Firm*—Edward J. Biskup

[57] ABSTRACT

An electrical connecting mechanism comprising an inner shaft member electrically connected to an outer shaft member by a flexible cable and having a rotatable carrier member therebetween which serves to guide the cable into contact with the inner surface of the outer shaft member or with the outer surface of the inner shaft member without twisting or tangling the cable during relative rotation of the shaft members.

1 Claim, 6 Drawing Figures

POSITIVE ELECTRICAL CONNECTING MECHANISM

This invention concerns electrical connecting mechanisms and more particularly a mechanism which maintains continuous electrical continuity between a pair of relatively rotatable shaft members by use of a positive electrical connection therebetween.

More specifically, the electrical connecting mechanism according to the present invention includes an outer shaft member and an inner shaft member supported for rotary movement about a common axis relative to the outer shaft member. A carrier member is located between the outer and inner shaft members and is supported for rotation relative to both of the shaft members. A roller is mounted on the carrier member and an arcuate groove is formed in the carrier member adjacent the roller. A flexible cable is electrically and mechanically connected at one end to the outer shaft member and electrically and mechanically connected at the other end to the inner shaft member. The cable has a length greater than the circumference of the inner shaft member and has an intermediate portion located in the arcuate groove so that rotation of the inner shaft member relative to the outer shaft member in one direction causes the cable to drive the carrier member in the same direction at an angular velocity less than that of the inner shaft member while allowing the cable to either wind about the inner shaft member or be positioned adjacent to the inner surface of the outer shaft member.

The objects of the present invention are to provide a new and improved electrical connecting mechanism which includes an inner shaft member and an outer shaft member that are mechanically and electrically connected through a flexible cable in a manner that allows rotation of the inner shaft member without twisting or tangling the cable; to provide a new and improved electrical connecting mechanism which includes an inner shaft member electrically connected to an outer shaft by a flexible cable and having a rotatable carrier member therebetween which serves to guide the cable into contact with the inner surface of the outer shaft member or the peripheral outer surface of the inner shaft member while allowing relative rotation of said shaft members; to provide a new and improved electrical connecting mechanism which includes a pair of relatively rotatable shaft members interconnected electrically and mechanically by a ribbon-like cable which is guided into a circular configuration in surface engagement with the outer shaft member or with the inner shaft member when one or the other of the shaft members are rotated relative to each other; and to provide a new and improved electrical connecting mechanism that allows relative rotation of a pair of shaft members that are electrically and mechanically interconnected by a flexible ribbon-like cable while permitting the cable to be wound between the shaft members during the relative rotation thereof.

Other objects and advantages of the present invention will be more apparent from the following detailed description when taken with the drawings in which.

Figure 1:
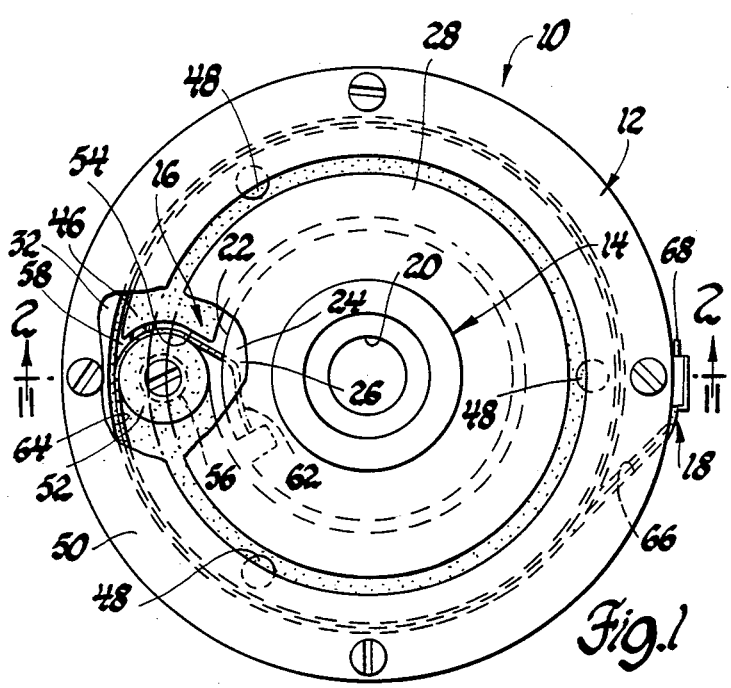
FIG. 1 is a plan view of an electrical connecting mechanism made in accordance with the present invention.
Figure 5:
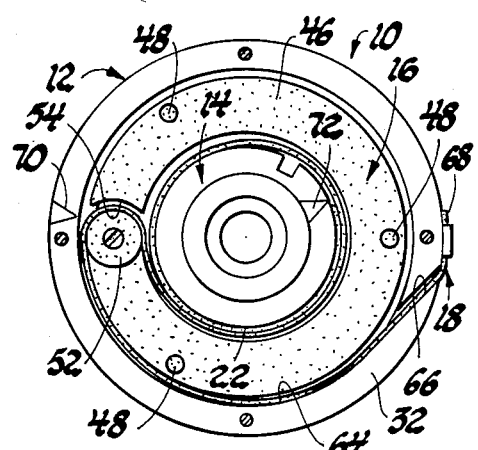
Figure 6:
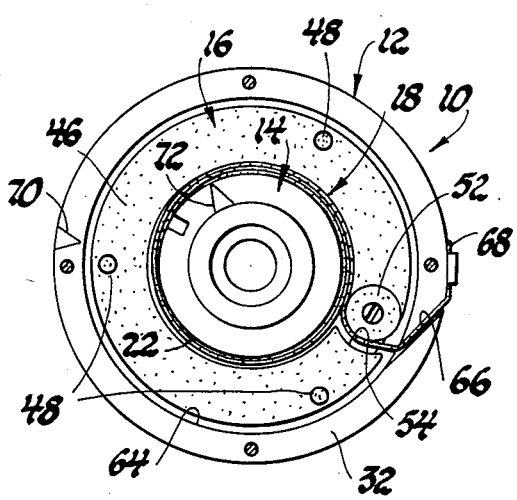

FIG. 5 is a view of the electrical connecting mechanism shown in FIG. 1 but shows the position of the carrier member and the cable after the inner shaft member is rotated counterclockwise approximately two and one half revolutions relative to the outer shaft member; and FIG. 6 is a view of the electrical connecting mechanism shown in FIG. 1 but shows the position of the carrier member and the cable after the inner shaft member has been rotated counterclockwise approximately three and three quarter revolutions relative to the outer shaft member.

Referring to the drawings and more particularly FIG. 1 thereof, an electrical connecting mechanism 10 is shown comprising, in general, an outer shaft member 12, an inner shaft member 14, a carrier member 16, and a flexible cable 18 having one or more wires embedded therein which are adapted to electrically connect the outer shaft member 12 to the inner shaft member 14. The electrical connecting mechanism 10 according to the present invention is intended to replace the usual slip ring device which normally carries electrical power and/or signals between a stationary member and a rotating member. The mechanism 10 is shown in a simplified form so as to clearly illustrate its construction and operation, and it will be understood that if a mechanism based on the electrical connecting mechanism 10 is constructed and utilized with a vehicle's steering wheel assembly for example, the outer shaft member 12 would constitute the stationary support column while the inner shaft member 14 would be fixed to the steering wheel and rotated relative to the stationary outer member.

Figure 2:
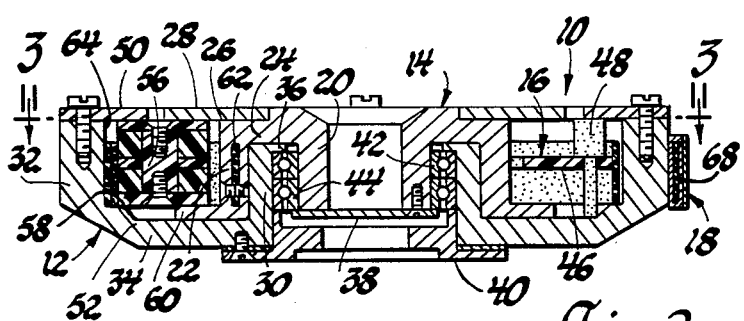
FIG. 2 is a sectional view of the electrical connecting mechanism taken on line 2—2 of FIG. 1.

As seen in FIGS. 1 and 2, the inner shaft member 14 is formed by a pair of radially spaced and concentric ring portions 20 and 22 rigidly interconnected by a bridging portion 24. The bridging portion 24 is formed with a shoulder 26 which rigidly supports an annulus 28 that extends radially outwardly beyond the ring portion 22. Similarly, the outer shaft member 12 is formed by a pair of concentric and radially spaced ring portions 30 and 32 interconnected by a bridging portion 34. A radially inwardly extending flange 36 is formed with the upper end of the ring portion 30 of the outer shaft member 12 and, together with a disk 38 secured to the lower end of the ring portion 20 of the inner shaft member 14 and an end cap 40 secured to the outer shaft member 12, serves to retain a pair of bearing assemblies 42 and 44 between the outer and inner shaft members 12 and 14 and allows relative rotation therebetween.

The carrier member 16 comprises a washer member 46 which is located between the outer and inner shaft members 12 and 14 substantially midway between the annulus 28 and the bridging portion 34. The washer member 46 rigidly carries three vertically oriented pin-like spacers 48 that are angularly spaced from each other by 120 degrees as seen in FIG. 1 and maintain the washer member 46 in the substantially midway position as seen in FIG. 2. In this regard, the lower end of each of the spacers rests on the bridging portion 34 of the outer shaft member 12 while the upper end of each of the spacers 48 contacts an annulus 50 concentric with the annulus 28 and secured to the ring portion 32 of the outer shaft member 12. The carrier member 16 is also provided with a guide roller 52 adjacent one side of which is an arcuate groove 54 formed in the washer member 46. The guide roller 52 is mounted on a pin 56 rigid with the washer member 46 and resting on a shoulder 58 formed on the ring portion 32 of the outer shaft member 12 and on a flange 60 integral with the ring portion 22 of the inner shaft member 14.

As best seen in FIGS. 1 and 2, one end 62 of the cable 18 is mechanically and electrically secured to the ring portion 22 of the inner shaft member 14 from where it passes through the groove 54 in the washer member 46 of the carrier member 16 and then is wound one and one half times about the peripheral edge of the washer member 46 adjacent the inner surface 64 of the outer shaft member 12. From this point, the cable 18 passes through a slot 66 (FIG. 1) formed in the ring portion 32 of the outer shaft member 12 and has the other end 68 of the cable 18 mechanically and electrically connected to the outer periphery portion of the outer shaft member 12.

Figure 4:
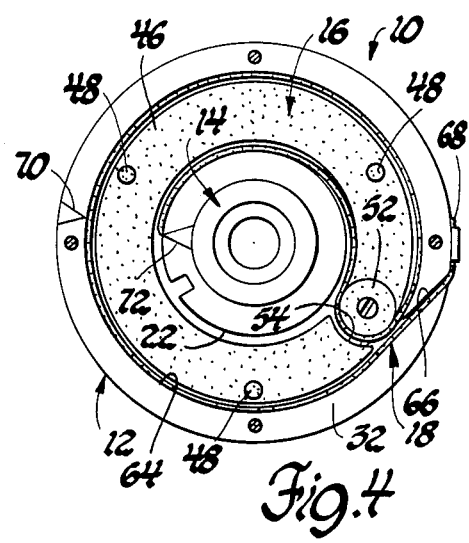
FIG. 4 is a view of the electrical connecting mechanism shown in FIG. 1 but shows the position of the carrier member and the cable after the inner shaft member is rotated one complete revolution counterclockwise relative to the outer shaft member.
Figure 3:
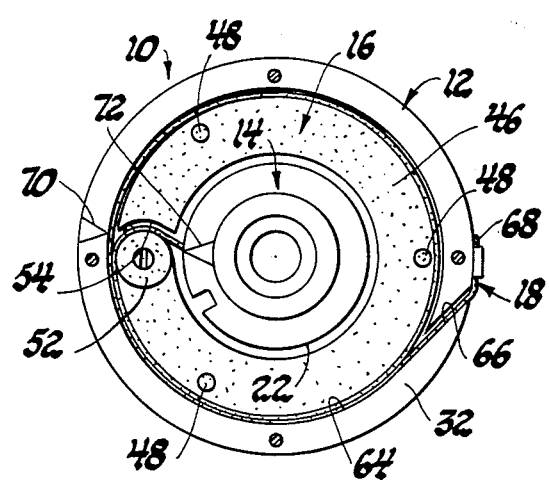
FIG. 3 is a reduced view of the electrical connecting mechanism as shown in FIG. 1 with certain parts removed to show in detail the cable, the inner and outer shaft members, and the carrier member therebetween.

With the parts of the electrical connecting mechanism 10 arranged as shown in FIGS. 1 and 2, approximately four revolutions in a counterclockwise direction of the inner shaft member 14 relative to the outer shaft member 12 can occur while the cable 18 maintains mechanical and electrical connection between the two shaft members 12 and 14. In this regard, and as seen in FIG. 3 which shows all the parts of the electrical connecting mechanism 10 in the same relative positions as seen in FIG. 1 but with the two annuli 28 and 50 removed, when the inner shaft member 14 is rotated one full revolution or 360 degrees in a counterclockwise direction so that the arrow 70 marked on the outer shaft member 12 and the arrow 72 marked on the inner shaft member 14 are once again aligned, so as to be pointing towards each other, a portion of the cable 18 moves from the position along the periphery of the washer member 46 and winds about the outer peripheral portion of the ring portion 22 of the inner shaft member 14 as seen in FIG. 4. In other words, as seen in FIG. 3, as the inner shaft member 14 rotates in a counterclockwise direction it pulls the cable 18 onto the ring portion 22 and, as a result, the carrier member 16 is rotated approximately 180 degrees in a counterclockwise direction from the position seen in FIG. 3 to that shown in FIG. 4. When the arrow 72 marked on the inner shaft member 14 is again radially aligned with the arrow 70 on the outer shaft member 12, as seen in FIG. 4, sufficient cable 18 has been pulled by the inner shaft member 14 so as to have approximately 180 degrees of the outer peripheral portion of the inner shaft member 14 wound with the cable 18. Continued counterclockwise rotation of the inner shaft member 14 approximately 585 degrees causes an additional amount of cable 18 to be transferred from the periphery of the washer member 46 and wound about the inner shaft member 14 and allows the various parts of the electrical connecting mechanism to assume the position shown in FIG. 5. Finally, an additional 405 degrees counterclockwise rotation of the inner shaft member 14 results in substantially all of the cable 18 being wound about the inner shaft member, as seen in FIG. 6, except for the portion of the cable 18 in the groove 54 and the slot 66 in the ring portion 32 of the outer shaft member 12.

After the various parts of the mechanism are in the positions of FIG. 6, the inner shaft member 14 can be rotated in a clockwise direction relative to the outer shaft member 12. In so doing, the parts of the mechanism 10 will move through the positions shown in FIG. 5, FIG. 4 (in that order) and finally return all of the parts of the mechanism 10 to the relative positions shown in FIG. 3. During this return movement of the inner shaft member 14, the cable 18 drives the carrier member 16 through the groove 54 in the washer member 46 causing the latter to rotate in a clockwise direction so that the cable 18 is transferred from the inner shaft member 14 to the outer periphery of the washer member 46 adjacent to the inner surface 64 of the ring portion 32. It will be noted that the inner and outer diameters of the washer member 46 are sized so as to allow sufficient space for accommodating the cable 18 as it moves from the outer diameter of the inner shaft member 14 to the outer diameter of the washer member 46 and vice versa.

An electrical connecting mechanism such as the mechanism 10 seen in the drawings and described above has been built and successfully tested so as to obtain approximately three and three quarter complete revolutions of the inner shaft member 14 starting from the position shown in FIG. 3 and ending in the position shown in FIG. 6 and the same number of relative revolutions in the opposite direction. During such time, the opposite ends of the cable 18 maintain positive electrical connection between the inner and outer shaft members. The mechanism built and tested utilized a flexible cable 18 called "HIGH FLEX LIFE" made by W. L. Gore Associates of Flagstaff, Ariz. and had a length of approximately 41 cm. The outer diameter of the inner shaft member 14 measured 48 mm while the inner diameter of the outer shaft member 12 measured 86 mm. The carrier member 16 and roller 52 were made from Teflon and the roller 52 had an outer diameter that measured 15 mm. The outer diameter of the carrier member 16 measured 82 mm and the inner diameter measured 52 mm.

Various changes and modifications can be made in this construction without departing from the spirit of the invention. Such changes and modifications are contemplated by the inventors and they do not wish to be limited except by the scope of the appended claims.

The embodiments of the invention in which an exclusive property or privilege is claimed are defined as follows:

1. An electrical connecting mechanism comprising an outer shaft member, an inner shaft member, said outer and inner shaft members supported for relative rotary movement about a common axis and having an annular space therebetween, a carrier member in the form of a flat washer located in said space between said outer and inner shaft members and supported for rotation relative to said outer and inner shaft members, a roller mounted on said carrier member, an arcuate groove formed in said carrier member adjacent said roller, three pin-like members rigidly connected to and circumferentially equally spaced about said carrier member for preventing movement thereof along said common axis, a single flexible ribbon-like cable electrically and mechanically connected at one end to said outer shaft member and electrically and mechanically connected at the other end to said inner shaft member, said cable having a length greater than the circumference of the inner shaft member and having a portion intermediate said one end and said other end of said cable located in said arcuate groove so that rotation of said inner shaft member relative to said outer shaft member in one direction causes said cable to drive said carrier member through said groove in the same direction while the cable winds around said inner shaft member, and rotation of said inner shaft member relative to said outer shaft member in a direction opposite to said one direction causes the cable to drive said carrier member through said roller and to unwind from said inner shaft member while being guided by said roller into engagement with said outer shaft member along the inner surface thereof.

* * * * *